Sept. 9, 1958 W. SPENCE 2,851,042
COOLING EQUIPMENT
Filed Sept. 24, 1956

INVENTOR
WILLIAM SPENCE
ATTORNEY

United States Patent Office 2,851,042
Patented Sept. 9, 1958

2,851,042

COOLING EQUIPMENT

William Spence, Rugby, England, assignor to The British Thomson-Houston Company Limited, London, England, a British company Application September 24, 1956, Serial No. 611,619

Claims priority, application Great Britain October 11, 1955

3 Claims. (Cl. 134—57)

This invention relates to equipment for effecting accelerated cooling from an elevated temperature of travelling strip or sheet material such, for example, as hot metal strip delivered by a rolling mill.

To obtain a uniform crystal structure of a given nature in metal strip rolled from a hot slab, it is necessary for the strip, after rolling, to undergo accelerated cooling until a predetermined temperature has been reached. The cooling is usually effected by spraying water or other coolant on to the strip and hitherto control of the sprays to determine the extent of cooling effected has been left to the discretion of the operator. As can be appreciated the amount of cooling required for the leading portions of the strip is greater than for the tail-end portions, and in addition to this other conditions such as the temperature of the slab when it is fed to the mill have to be taken into account.

An object of the present invention is to provide automatically controlled equipment for cooling travelling strip or sheet material from an elevated temperature to, or at least close to, a required predetermined lower temperature.

According to the invention such equipment provides first and second cooling stages through which the sheet or strip will pass in turn and includes temperature responsive means for detecting the temperature of the strip or sheet at a position in its travel adjacent the end of the second cooling stage, comparison means for deriving a signal representing the difference, if any, between the detected temperature and a desired temperature for the strip or sheet at said position, and control means responsive to said signal for automatically and continuously regulating the degree of cooling effected in said second stage in such manner as to tend to reduce any difference between the detected and the desired temperatures.

It is contemplated that as is usual spray cooling will be employed for both the first and the second stages, the flow of coolant to the sprays of the second stage being automatically regulated in the manner set forth. The flow to the sprays of the first stage may be arranged to be under the control of an operator.

In carrying out the invention the derived difference signal preferably is electrical in nature and controls in accordance with its magnitude and sign the extent by which a regulating valve for the second cooling stage is open. Conveniently the valve would be biased, as by a spring, towards either its open or, preferably, its closed position, and an electric thruster device would be provided for urging the valve towards its other position to an extent determined by the electric difference signal.

A particular embodiment of the invention as applied to cooling equipment for hot metal strip issuing from a rolling mill, is illustrated in the accompanying drawing in which.

Figure 1:
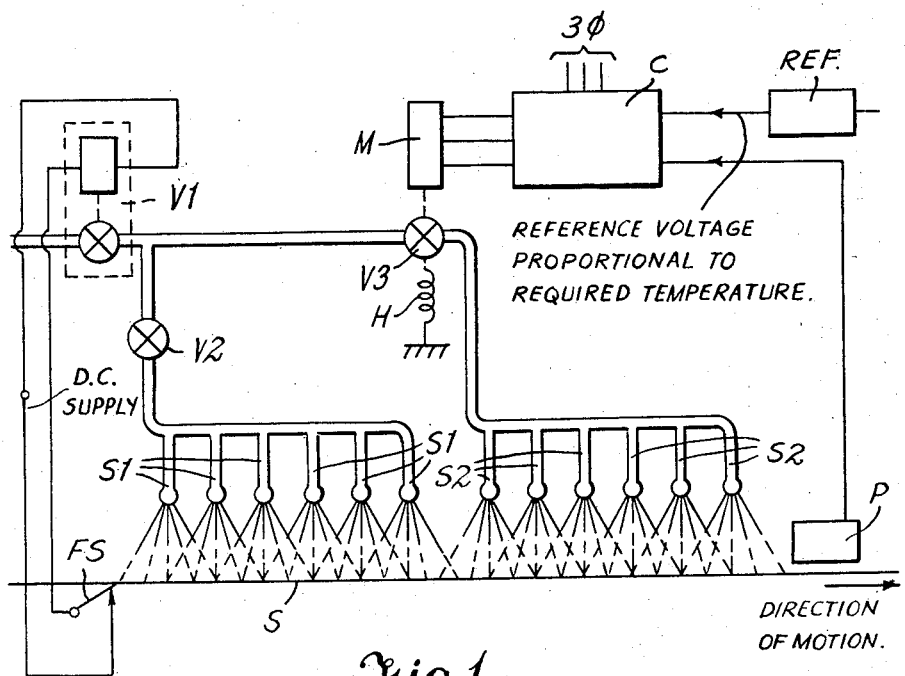
Fig. 1 is a schematic diagram of the controlled cooling apparatus.

Referring to Fig. 1, two groups of sprays S1 and S2 beneath which the strip S to be cooled will pass in turn in the direction indicated are supplied with water or other coolant through a main solenoid-operated valve V1 common to both groups and arranged to be opened when the leading edge of a strip strikes a flag switch FS at a position before it reaches the first group of sprays S1. The flow of coolant to the first group of sprays S1 is controlled by a valve V2 which may for instance be adjusted manually or by remote control while the flow to the second group of sprays S2 is automatically regulated by a valve V3 controlled in accordance with the difference between a required exit temperature for the strip and the temperature to which the strip is in fact cooled by the second group of sprays.

This valve V3 is biased towards its closed position by a spring H whose action is opposed by an electric thruster motor M the input to which is controlled in accordance with difference between the actual and required temperatures and is arranged to be of such magnitude when the temperature difference is zero that the valve V3 is then held about half-way open by the thruster motor M. An infra-red radiation pyrometer or other temperature measuring device P providing an electrical output is located close to the path of the strip as near as possible to the position at which the strip passes clear of the second group of sprays S2. The electrical signal provided by this device P is compared with a constant electrical signal derived from an adjustable source REF and adjusted to represent the desired temperature. Any difference between the two compared signals, amplified if necessary, is applied to a controller C which, in dependence on the magnitude and sign of the difference signal, varies the input to the thruster motor M in such manner as to adjust the valve V3, and thus the flow of coolant to the sprays S2, in the appropriate sense for modifying the exit temperature of the strip towards the required value. As will be appreciated this will result in the difference signal being reduced towards zero. Once the exit temperature has been brought substantially to the required value in this way it will be maintained substantially constant since any deviation will produce a difference signal which in turn will cause a compensating variation of the flow of coolant to the sprays S2.

Figure 2:
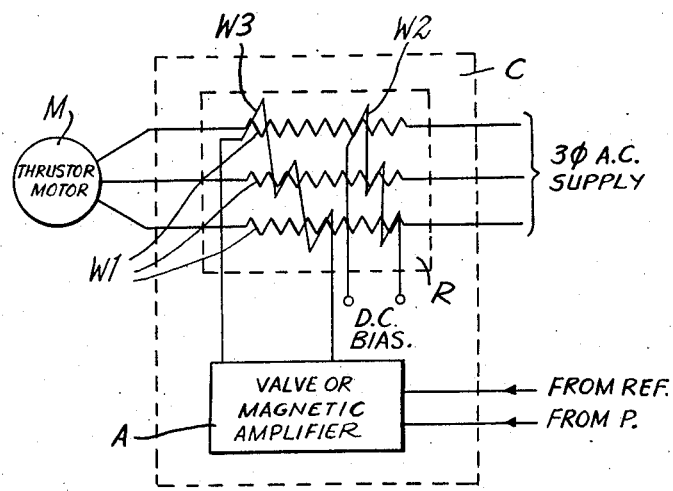
Fig. 2 shows a preferred form for part of the control circuit shown only in block form in Fig. 1.

The controller C for regulating the input to the thruster motor M, assuming the latter to be a three-phase motor, may comprise as shown in Fig. 2 a three-phase saturable reactor R connected in the supply circuit for the motor. The saturable reactor R, in addition to its main windings W1, has a bias winding W2 to which constant D. C. voltage is applied, and a control winding W3 to which a voltage proportional to the difference signal is applied from a thermionic or magnetic amplifier A which may also serve to compare the temperature signal from the device P and the reference signal from the source REF: for instance a magnetic amplifier A could have these signals applied to respective control windings acting in opposition. The bias voltage for the saturable reactor R is chosen so that when the difference signal and thus the voltage applied to the control winding W3 is zero, the input to the thruster motor M has a mean value such that as previously indicated the valve V3 (Fig. 1) controlled by the motor is held about half-way open. Should the difference signal depart from zero in either direction, indicating that an adjustment of the coolant flow to the sprays S2 is necessary to correct the exit temperature of the strip, the input to the thruster motor M is modified appropriately by the action of the control winding W3 on the impedance of the main windings W1 of the saturable reactor R.

What I claim is:

1. Apparatus for cooling travelling strip or sheet material comprising first and second cooling stages through which the material will pass in turn, temperature responsive means for detecting the temperature of the strip or sheet at a position in its travel adjacent the end of the second cooling stage, comparison means for deriving a signal representing the difference, if any, between the detected temperature and a desired temperature for the strip or sheet at said position, and control means responsive to said signal for automatically and continuously regulating the degree of cooling effected in said second stage in such manner as to tend to reduce any difference between the detected and the desired temperatures.

2. Apparatus as claimed in claim 1 wherein said temperature responsive means is of a kind providing an electrical signal representing the temperature detected and said comparison means provides an electrical difference signal in accordance with the magnitude and sign of which the control means regulates the degree of cooling effected in the second stage.

3. Apparatus as claimed in claim 2 wherein there is provided a valve for regulating flow of coolant to the second stage, said valve being adjustable between an open and a closed position, and being normally biased towards one of said positions, and an electric thruster device coupled with said valve and controlled by said comparison means to urge said valve towards the other of its said positions to an extent determined by the difference signal.

No references cited.